United States Patent
Bass et al.

[11] 4,196,861
[45] Apr. 8, 1980

[54] CROP MATERIAL SAVER FOR A FORAGE HARVESTER FEED ROLL ASSEMBLY

[75] Inventors: Merlyn D. Bass; Robert D. Black; Jerry L. Krafka, all of Ottumwa, Iowa

[73] Assignee: Deere & Company, Moline, Ill.

[21] Appl. No.: 955,704

[22] Filed: Oct. 30, 1978

[51] Int. Cl.$^2$ .................................................. B02C 18/22
[52] U.S. Cl. ............................. 241/101.7; 241/222
[58] Field of Search .................................. 302/11, 13;
  241/221-224, 101.7; 144/246 R; 56/14.5, 16.4,
  16.6, DIG. 1

[56] References Cited
U.S. PATENT DOCUMENTS

| | | | |
|---|---|---|---|
| 3,552,463 | 1/1971 | Witt | 241/222 |
| 3,933,314 | 1/1976 | Luscombe | 241/101.7 X |

FOREIGN PATENT DOCUMENTS 1424508  2/1976  United Kingdom .................. 302/11

Primary Examiner—Mark Rosenbaum

[57] ABSTRACT

In a forage harvester, a pan-like shield wraps the underside of the lower forward feed roll of a feed roll assembly having opposed upper and lower pairs of feed rolls. The pan is disposed so that particles of material, such as corn or sorghum kernels, which may become separated from a mat of material being fed through the rolls and pass downwards in front of the forward lower feed roll or between the front and rear lower rolls are intercepted by the pan and recirculated by the forward roll between the roll and the pan and re-presented to the inlet side of the feed roll assembly so that those particles have another opportunity to be fed through with the mat of crop material to the cutterhead.

13 Claims, 2 Drawing Figures

CROP MATERIAL SAVER FOR A FORAGE HARVESTER FEED ROLL ASSEMBLY

BACKGROUND OF THE INVENTION

This invention relates to a feeding system for feeding crop material to a cutterhead, for example in a forage harvester, and more particularly to an improved feed roll assembly for such a machine.

A typical forage harvester feed roll assembly includes opposed upper and lower pairs of feed rolls driven in such directions that crop material gathered from a field by a forward mounted header and delivered to the inlet of the feed roll assembly, that is to the "bite" of the opposed upper and lower forward or upstream feed rolls, is conveyed rearwardly in an approximately horizontal mat between the upper and lower pairs of rolls to a cutterhead for reduction of particle size.

When harvesting certain materials, significant crop loss may occur through particles of material passing downward between the delivery outlet of the header adjacent the feed roll assembly and the forward lower roll or between the forward and rearward lower rolls. This type of loss occurs particularly in grain sorghum head cutting, ear corn and dry whole-plant corn and similar harvesting operations. It is known to reduce such losses by providing a floor or shield extending from the delivery point of the header between the upper and lower feed roll pairs and terminating adjacent the rear feed rolls to cover the gaps adjacent the forward lower roll. However, with such a shield in place, the efficiency and capacity of the feed roll system is seriously reduced because only two active feed rolls are available to feed the material and because of friction between the moving material and the fixed shield.

SUMMARY OF THE INVENTION

Accordingly, an object of the invention is to provide a means of preventing loss of particles of crop material adjacent a lower feed roll without significantly modifying the feeding characteristics, capacity and efficiency of the feed roll system and which is low in cost and easy to install.

The invention comprises a pan substantially wrapping the underside of a lower feed roll and including a portion overlapping or contiguous with the crop delivery floor of a forwardly mounted header.

An advantage of the invention is that the pan may comprise separate portions carried by the feed roll assembly and header respectively, an arrangement which simplifies installation and assembly, the two pan portions mating when the header is mounted on the forage harvester so as to create an essentially uninterrupted pan-like floor under the lower feed roll.

It is a feature of the invention that the material becoming separated from the mat being fed by the rolls and passing downwards adjacent a lower roll is recirculated between the lower feed roll and the pan to be re-presented at the feed roll inlet and given another opportunity to be conveyed with the mat of incoming material to the cutterhead.

It is another feature of the invention that, in combination with a rear lower roll associated with a shear bar assembly mounted rearward of and closely adjacent the rear lower feed roll so that no crop material loss occurs between them, a forward pan connecting with the delivery floor of the header and having a rearward edge somewhat underlying the rear roll is sufficient to prevent substantially all downward loss of particles from adjacent the lower feed rolls.

Another feature of the invention is that assembly of the pan may be faciliated by making it in two pieces and supporting a first portion attached to the feed roll assembly between feed roll assembly side sheets with its front edge supported and reinforced by a transverse (frame) member and a second or forward portion carried by a header attached to the header delivery floor and disposed so that when the header is mounted it abuts the rear pan portion so as to complete the wrapping of the lower portion of the forward lower roll.

When the lower roll is fluted or longitudinally ribbed, the crop material saving pan may wrap the roll very closely so that material is carried efficiently around within the grooves or flutes of the roll and re-presented to the feed roll assembly inlet.

DESCRIPTION OF THE PREFERRED EMBODIMENT

Figure 1:
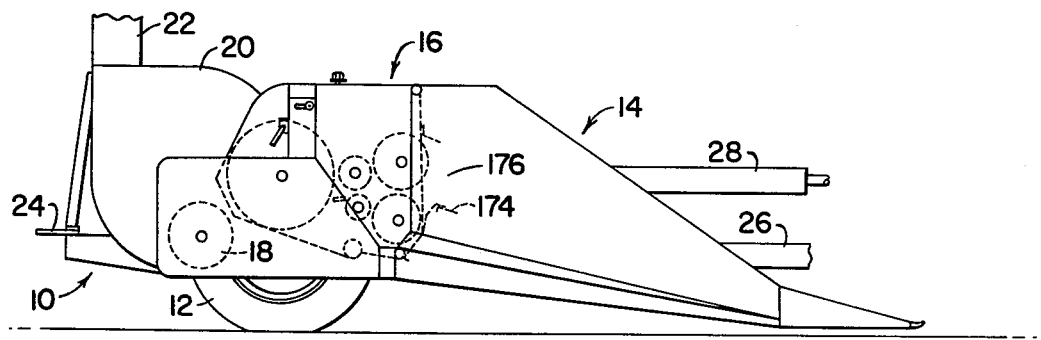
FIG. 1 is a somewhat schematic side elevation of a forage harvester embodying the invention with protions of the forage harvester tongue and discharge chute omitted.

The invention is embodied in a forage harvester otherwise conventional, such as the pull-type machine illustrated in FIG. 1. The machine includes a main frame 10 supported above the ground on a pair of transport wheels 12. A forward havesting unit such as the cornhead 14 illustrated delivers harvested crop material to a feeding and cutterhead assembly 16 which in turn delivers it to a transverse auger conveyor 18 whence a blower 20 discharges it through a discharge spout 22, only part of which is shown. Discharged material may be collected in a trailer (not shown) connected to a trailer hitch 24 on the harvester. The forage harvester is drawn and powered by a suitable tractor which is connected to a tongue 26 and a drive shaft assembly 28, only the rearward portions of which are shown in FIG. 1. A suitable drive train (not shown) transmits power from the drive shaft 28 to the components of the forage harvester.

Figure 2:
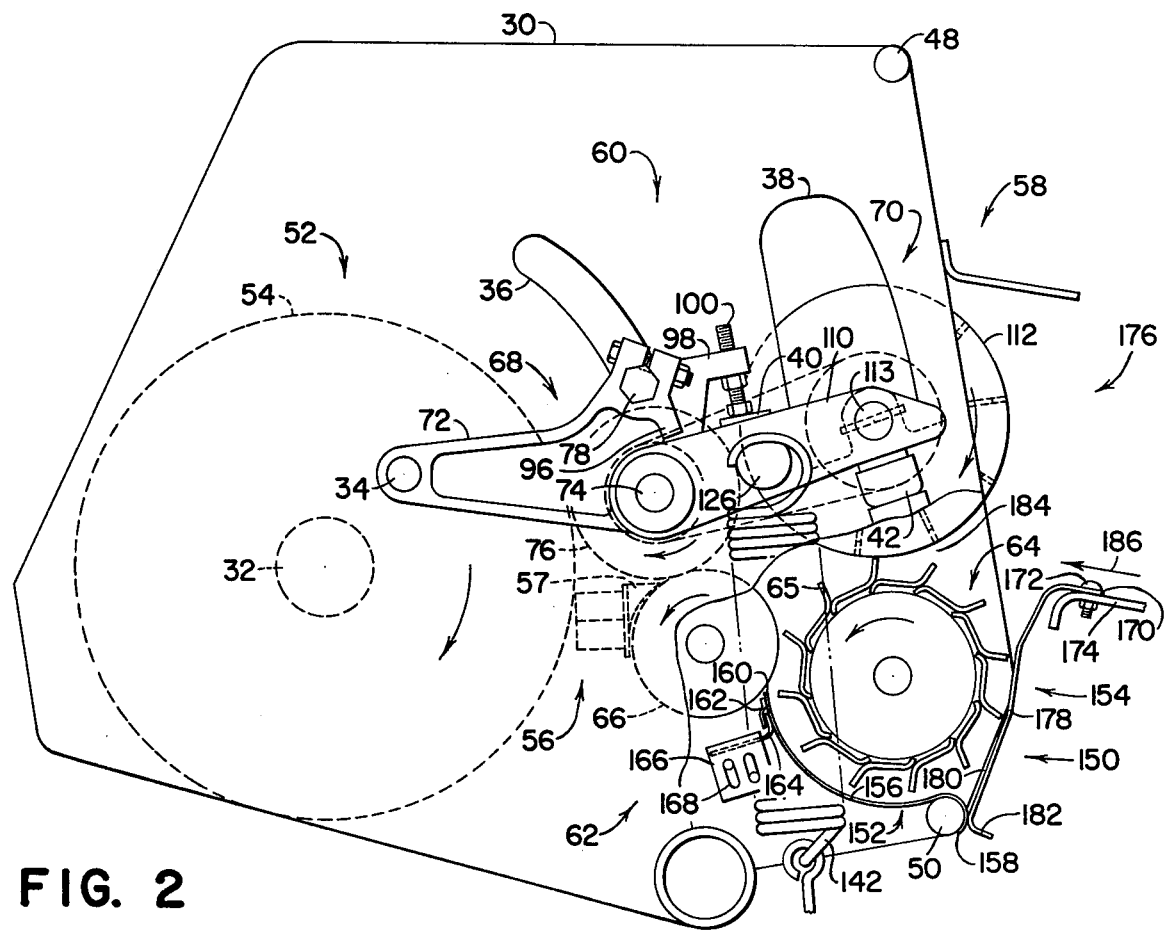
FIG. 2 is an enlarged semi-schematic partial side elevation of the feed roll assembly and cutterhead portion of the forage harvester with a portion of a feed roll assembly side sheet cut away to show the relationship between the crop saving pan, the lower feed rolls and the forage harvester header delivery floor.

The feeding and cutterhead assembly 16 is shown in more detail in FIG. 2 and includes a pair of generally similar but opposite left- and right-hand side sheet assemblies 30, spaced apart and generally upright, serving as frame members to support and house the feeding and cutterhead components. The side sheets 30 are suitably reinforced and supported on the forge harvester frame 10 by subframe members not discussed here. Each side sheet 30 includes a cutterhead cylinder bore and mount 32, indicated only schematically, a rigidly attached downstream feed roll assembly pivot 34, a generally arcuate downstream feed roll assembly clearance slot 36 centered on the pivot 34, and a larger irregularly-shaped upstream feed roll clearance slot 38.

Downstream feed roll and upstream feed roll down-stops 40 and 42 respectively are rigidly attached on the outer side of each opposite side sheet 30. Transverse upper and lower harvesting unit support arms 48 and 50 respectively are carried by the opposite side sheets 30 adjacent their upper and lower forward corners, extending between and projecting outwards from said sides.

Journaled between the lower rearward portion of the opposite side sheets 30 is a cutterhead assembly 52 which is generally conventional and includes a cylindrical cutterhead 54 (shown only in outline) carrying on its cylindrical periphery a plurality of helically disposed knives and which functions as is well known in cooperation with a stationary shear bar assembly such as that shown at 56. A stripper 57 is carried in the shear bar assembly and extends transversely between the side sheets 30.

A feeding conveyor assembly 58, between the opposite side sheets 30 and immediately ahead or upstream of the cutterhead assembly 52 consists of a yieldably floating upper conveyor assembly 60 and immediately below it an opposing fixed lower conveyor assembly 62, the latter consisting of a fluted upstream lower feed roll 64, the flutes being defined by longitudinal ribs 65 and a smooth surface smaller downstream lower feed roll 66 mounted closely adjacent the shear bar stripper 57. A feeding conveyor assembly of this general type is described more fully in co-pending patent application Ser. No. 922,029, also assigned to the assignee of the present invention.

The upper feeding conveyor assembly 60 is pivotally mounted and articulated and consists of downstream and upstream feed roll assemblies 68 and 70 respectively. The downstream assembly 68 consists of a pair of opposite radius arms 72 extending alongside the outer surfaces of the opposite side sheets 30, a transversely extending feed roll shaft 74 and, carried rigidly and concentrically by the shaft a downstream upper feed roll 76, extending transversely between the opposite side sheets 30. The downstream feed roll assembly 68 also includes a transverse leveler shaft 78 extending between the opposite radius arms 72. Each radius arm 72 also includes, disposed somewhat forward of the axis of the upstream roll 76, a rotational stop boss 96 (FIG. 2) protruding from the outer side of the radius arm. An adjustable stop arm 98 is provided by a forward extension of the radius arm 72 and carries an adjustable threaded stop screw 100.

The upstream upper feed roll assembly 70 includes opposite feed roll arms 110 extending generally parallel but outside of the opposite side sheet assemblies 30 and supporting between them an upstream upper feed roll 112 journaled on a shaft 113. The upstream feed roll arms 110 are each pivotally connected to the downstream feed roll arms 72 for pivoting about the axis of the downstream upper feed roll 76. The opposite stop bosses 96 of the radius arms 72 engage the upper sides of the corresponding forward arms 110 for limiting rotational movement between them.

A pair of tension springs 142, each hooked at one end over the spring bosses 126 of the feed roll arms 110 and at their other ends to frame members (not shown) bias the upper conveyor assembly 60 downwards towards the fixed lower conveyor assembly 62.

The drive input to the upper and lower feed rolls is conventional and includes a universal joint and sprocket assembly (not shown) rigidly attached to the downstream upper feed roll shaft 74 at its left-hand end and coupled or connected to an extension (not shown) of the forage harvester drive train. The downstream feed roll 76 is thus driven directly while power is transmitted to the upstream feed roll 112 through conventional chain and sprocket assemblies. In normal forage harvesting operation, the direction of rotation of the feed rolls 64, 66, 76 and 112 is, of course, as shown in FIG. 2 but conventional means (not shown), connected to the drive train are provided for selectively reversing the driven direction of the rolls.

Substantially wrapping the lower half of the lower forward feed roll 64 is a lower feed roll pan assembly 150 comprising a rear portion 152 and a forward portion 154. The rear portion 152 extends between the opposite side sheets 30, has an arcuate cross section and is supported so that its inner surface 156 is concentric with the lower forward feed roll 64. The rear pan portion 152 wraps approximately the lower rear quadrant of the lower feed roll 64 extending somewhat more than 90° of arc. Its forward edge is rolled into a lip 158 which is seated on the lower header support arm 50. The rearward upper edge 160 is disposed close to the periphery of the rear lower feed roll 66 somewhat underlying the forward portion of that roll. An elongated offset clip 162 is rigidly attached to the outer surface of the rear pan portion 152 adjacent its rear upper edge 160 so as to create a downward facing elongated transversely extending slot or socket. This socket is engaged by a transversely extending pan support angle 164 which is rigidly attached at each of its opposite ends to a pan support clip 166 provided with slots 168 providing for generally vertical adjustment of the clip in relation to the sidesheet 30 on which it is mounted. In assembly, the rear feed roll pan portion rear edge 160 is threaded between the lower forward feed roll 64 and the header support arm 50 and around the roll until the lip 158 is seated on the support arm 50. The pan portion 152 is then held in approximately the position shown in FIG. 2 while the support angle 164 is slid upwards into the socket 163 and the clips 166 are, before tightening, adjusted upwards to hold the pan portion 152 close to the surface of the roll 64 and reduce to a practical minimum the running clearance between the roll 64 and the inner surface 156 of the rear feed roll pan portion 152.

The forward lower feed roll pan portion 154 transversely spans and effectively wraps the forward lower portion of the lower forward feed roll 64. It is preferably made of sheet metal and includes at its upper extremity a forwardly and slightly downwardly extending flange 170 which conforms to and by which it is attached to, using suitable fasteners 172, the rearwardly and upwardly sloping floor 174 of the discharge opening 176 of the header 14. The pan forward portion 154 includes an offset section 178 so that its rearward upper surface 180 conforms more nearly to the periphery of the lower forward feed roll 64. The rearward lower edge of the pan forward portion 154 is reinforced by a downwardly and forwardly directed flange 182 and overlaps and bears against the lip portion 158 of the pan rear portion 152. The forward pan portion 154 is formed so that when the fasteners 172 are tightened, its lower portion bears against the lip portion 158 of the rear pan portion 152 so that a continuous crop material particle intercepting surface is created extending from forward of the forward lower feed rolls 64 rearward to a point underlying a forward portion of the rear lower feed roll 66.

In operation the forage harvester is advanced over a field of crop and the harvesting unit 14 delivers crop material to the bite 184 between the upper and lower upstream feed rolls 112 and 64 respectively and material is fed downstream as a mat between the upper and lower conveyor assemblies 60 and 62 respectively. As can be seen in FIG. 2, the uppermost surfaces of fixed lower rolls 64 and 66, the floor 174 of the header outlet and the shear bar assembly 56 are approximately in horizontal alignment and form a conveying surface for feeding material approximately radially to the cutterhead cylinder 54. The general direction of material flow of the mat of crop material being transferred from the header discharge opening floor 174 to the feed rolls is indicated by the arrow 186 in FIG. 2. In FIG. 2 the upper conveyor assembly 60 is shown in a closed, at rest position—that is as if no crop was being conveyed and with the upstream feed roll 112 effectively "downstopped" through the engagement of the feed roll arms 110 with the upstream downstops 42 and with the downstream upper feed roll 76 downstopped through engagement of the adjusting screws 100 with the downstream downstops 40. When crop material flows both upper rolls will float, being raised from their stops by the pressure of the crop material mat, the upper conveyor assembly 60 as a whole and the downstream feed roll assembly 68 being anchored by and pivoting about the opposite pivots 34, while the pivot connection between the downstream and upstream roll assemblies, 68 and 70 respectively, permits the upstream assembly 70 to find its own level.

Although the lower members of the feeding assembly form an effective conveying surface as described in the preceding paragraph, it is not continuous in that there ar "gaps" immediately forward and rearward of the upstream lower feed roll 64 into which crop material particles, such as corn kernels and the like becoming detached for any reason from the incoming mat of crop material, can pass donwardly. The bulk of any material passing downwards to the rear of the forward feed roll 64 may, because of the "relief" or flutes provided by the ribs 65 of the roll 64, pass freely down between that roll 64 and the smooth rearward lower roll 66 but will be intercepted by the rear pan portion 152. Because of the close conformity of both the rearward and forward pan portions 152 and 154, respectively, to the periphery of the lower forward feed roll 64, any such material will be carried around or recirculated by the roll and its ribs 65, downward, forward and then upward to be re-presented to the inlet or bite 184 of the feed roll assembly. It will be clear also that any crop material particles passing downward forward of the lower feed roll 64 will, if intercepted first by the forward pan portion 154, be deflected rearward and downwards until they are intercepted by the ribs 65 of the feed roll 64 or meet upcoming material when their direction of motion will be reversed and they will be carried upwards also to be re-presented to the bite 184 of the feed roll assembly. The juxtaposition of the scraper portion 57 of the shear bar assembly 56 and the smooth lower rearward feed roll 66 prevents any substantial downward loss of crop material after it has been engaged by the rear feed roll 66. Thus, by the provision of an effectively continuous intercepting surface having a forward portion 154 contiguous with the floor 174 of a header discharge opening 176 and a rearward portion terminating closely adjacent the smooth rearward lower feed roll 66 and underlying a forward portion of that roll 66, such operations as grain sorghum head cutting, ear corn and dry whole-plant corn harvesting can be undertaken without the significant downward losses of crop material adjacent the lower forward feed roll which may be a serious problem in machines not equipped with a crop-saving attachment and also without the losses in crop feeding capacity and efficiency which occur when a conventional crop-saving attachment comprising a floor overlaying the lower feed rolls is used.

We claim:

1. In a forage harvester having a forward mounted header for gathering crop material from a field and discharging it in a stream from an outlet of the header, the outlet having a floor, a crop reducing element, and a feed roll assembly for transferring the stream of crop material from the header to the crop reducing element, the feed roll assembly including a pair of opposing contra-rotating closely spaced feed rolls including an upper roll and a lower roll, said pair of feed rolls having a bite in a crop-receiving relationship with the outlet of the header for engaging the stream of material and said rolls rotating so as to deliver rearwardly the stream of material engaged by and carried between the rolls, at least a portion of the crop material becoming detached from the stream and passing downwards adjacent the lower roll, the improvement comprising an intercepting element extending below the lower feed roll for intercepting and, in cooperation with the lower feed roll, recirculating at least some of that portion of the crop material passing downwards adjacent the lower feed roll and re-presenting said material to the feed roll bite.

2. The invention defined in claim 1 wherein the intercepting element comprises an elongated pan substantially wrapping the lower half of the lower feed roll.

3. The invention defined in claim 2 wherein the pan has a forward edge and is so positioned that said edge is contiguous with the floor of the header outlet.

4. The invention defined in claim 3 wherein the pan forward edge is in approximately horizontal alignment with the feed roll bite.

5. A forage harvester comprising:
   a forward mounted header having a rearward outlet, for gathering crop material from a field and discharging it from the outlet, said outlet having a floor;
   a cutterhead rearward of the header for receiving crop material and reducing crop material particle size; and
   a feed roll assembly disposed between the header and the cutterhead for receiving and transferring crop material from the header outlet to the cutterhead and including
   left and right-hand opposite, generally fore-and-aft and vertically extending laterally spaced frame members,
   a transversely extending upper feed roll supported between the opposite frame members,
   a transversely extending first lower feed roll supported between the opposite frame members below and closely adjacent the upper feed roll,
   means for rotating the feed rolls in directions such that material presented to their upstream side and engaged by the rolls is carried rearwardly between them, at least a portion of the crop material presented to the rolls passing downward adjacent the lower roll, and
   a lower feed roll pan extending transversely between the frame members closely adjacent and substantially wrapping the lower half of the first lower roll for intercepting and, in cooperation with the first lower feed roll, recirculating and representing to the upstream side of the feed rolls, at least a portion of the crop material passing downward adjacent the first lower feed roll.

6. The invention defined in claim 5 wherein the surface of the first lower feed roll is longitudinally fluted and wherein the lower feed roll pan is closely spaced from the lower feed roll surface as it rotates.

7. The invention defined in claim 5 and further including a second lower feed roll extending transversely and supported between the opposite frame members and disposed between the first lower feed roll and the cutterhead.

8. The invention defined in claim 7 wherein the lower feed roll pan has a transversely extending rearward edge closely underlying a forward portion of the second lower feed roll so that crop material passing downwards between the lower feed rolls is intercepted by the pan.

9. The invention defined in claim 8 wherein the lower feed roll pan is contiguous with the floor of the header outlet and the second lower feed roll is spaced from the cutterhead and further including a shear bar assembly substantially filling the space between the cutterhead and the second lower feed roll so that the lower feed roll pan, the shear bar assembly and lower feed rolls cooperate to intercept substantially all crop material passing downwards between the header outlet floor and the cutterhead.

10. The invention defined in claim 5 wherein the lower feed roll pan is contiguous with the floor of the header outlet.

11. The invention defined in claim 5 wherein the lower feed roll pan includes a first portion extending transversely between and supported by the opposite frame members, said portion being arcuate in cross section and having an inner surface closely spaced from the periphery of the first lower feed roll.

12. The invention defined in claim 11 and further including a transverse header support member disposed below the first lower feed roll and extending between and supported by the opposite frame members and wherein the lower feed roll pan includes a forward edge and said edge is supported by the transverse header support member.

13. The invention defined in claim 11 wherein the lower feed roll pan includes a second portion supported by the header floor substantially wrapping a forward lower portion of the first lower feed roll and having a forward edge contiguous with the floor of the header outlet and a rearward edge contiguous with the forward edge of the first portion of the lower feed roll pan.

* * * * *

UNITED STATES PATENT OFFICE
CERTIFICATE OF CORRECTION

Patent No. 4,196,861     Dated     8 April 1980

Inventor(s) Merlyn D. Bass, Robert D. Black and Jerry L. Krafka

It is certified that error appears in the above-identified patent and that said Letters Patent are hereby corrected as shown below:

Column 6, line 66, after "lower" second occurrence, insert -- feed --.

Signed and Sealed this

Second Day of December 1980

|SEAL|

Attest:

SIDNEY A. DIAMOND

Attesting Officer     Commissioner of Patents and Trademarks